United States Patent
Chang et al.

(10) Patent No.: US 7,043,429 B2
(45) Date of Patent: May 9, 2006

(54) SPEECH RECOGNITION WITH PLURAL CONFIDENCE MEASURES

(75) Inventors: Sen-Chia Chang, Changhua (TW); Shih-Chien Chien, Taichung (TW); Jia-Jang Tu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 749 days.

(21) Appl. No.: 10/107,314

(22) Filed: Mar. 28, 2002

(65) Prior Publication Data
US 2003/0040907 A1    Feb. 27, 2003

(30) Foreign Application Priority Data
Aug. 24, 2001  (TW) .............................. 90120965 A

(51) Int. Cl.
*G10L 15/08* (2006.01)
(52) U.S. Cl. ...................................... 704/236; 704/252
(58) Field of Classification Search ................ 704/231, 704/233, 236, 239, 240, 251, 252, 255
See application file for complete search history.

(56) References Cited

U.S. PATENT DOCUMENTS

| | | | |
|---|---|---|---|
| 5,754,978 A | 5/1998 | Pérez-Méndez et al. | |
| 6,061,646 A * | 5/2000 | Martino et al. | 704/3 |
| 6,185,528 B1 * | 2/2001 | Fissore et al. | 704/232 |
| RE38,101 E * | 4/2003 | Vysotsky et al. | 704/246 |
| 6,725,193 B1 * | 4/2004 | Makovicka | 704/233 |
| 6,735,562 B1 * | 5/2004 | Zhang et al. | 704/240 |
| 6,738,745 B1 * | 5/2004 | Navratil et al. | 704/227 |
| 6,832,191 B1 * | 12/2004 | Frasca et al. | 704/257 |
| 6,850,886 B1 * | 2/2005 | Abrego et al. | 704/240 |
| 2002/0198710 A1 * | 12/2002 | Hernandez-Abrego et al. | 704/240 |
| 2004/0254790 A1 * | 12/2004 | Novak et al. | 704/240 |

FOREIGN PATENT DOCUMENTS

JP       5-27795      2/1993

* cited by examiner

*Primary Examiner*—Martin Lerner
(74) *Attorney, Agent, or Firm*—Rabin & Berdo, P.C.

(57) ABSTRACT

A speech recognition system is used to receive a speech signal and output an output language word with respect to the speech signal. The speech recognition system has preset quantities for a first threshold, a second threshold, and a third threshold. The speech recognition system includes a first speech recognition device that is used to receive the speech signal and generate a first candidate language word and a first confidence measurement of the first candidate language word, according to the speech signal. A second speech recognition device is used to receive the speech signal and generate a second candidate language word and a second confidence measurement of the second candidate language word, according to the speech signal. A confidence measurement judging unit is used to output the language word, by comparing the first confidence measurement and the second confidence measurement to the above thresholds.

16 Claims, 2 Drawing Sheets

| | First embodiment | Second embodiment |
|---|---|---|
| Mandarin | 91.70 % | 91.93 % |
| Non-Mandarin | 92.23 % | 85.54 % |

SPEECH RECOGNITION WITH PLURAL CONFIDENCE MEASURES

This application incorporates by reference of Taiwan application Serial No. 90120965, filed Aug. 24, 2001.

BACKGROUND OF THE INVENTION

1. Field of the Invention

This invention relates to a speech recognition system, and more particularly, to a multilingual speech recognition system, which can recognize speech in various languages.

2. Description of Related Art

In recent years, speech recognition systems has been developed with several advantages, such as the convenient use, reduction of fabrication cost, and so on. Due to those advantages, the speech recognition system is widely applied to all kinds of businesses in various fields of trade. For example, a customer service center usually receives a lot of phone calls from its clients. In most phone calls, the clients often ask the same questions. In this situation, a lot of manpower would be consumed answering the same questions repeatedly. However, if the answering service is done through a speech recognition system with prerecorded speech providing the answers, then the recorded speech can be used to answer the usually standard questions. As a result, the manpower of the customer service center can be used in a more efficient way, so that the personnel cost in the company can be further reduced.

Since there has been a trend toward internationalization and the use of languages in our daily life has been much more diversified, the speech recognition system with an ability to recognize only one language has not been satisfying the needs of the market. On the other hand, the multilingual speech recognition system, which has been able to recognize speech of various languages, has become more valuable in the business market. Currently, the multilingual speech recognition system usually has the following design:

1. Several monolingual speech recognition system units with respect to their own specific languages are assembled into one unit as a multilingual speech recognition system. In this manner, each one of the independent monolingual speech recognition system units should have a fully functional language recognition unit. The speech recognition system usually performs one of two types of methods. One is that a language identification process is performed on the input speech signals, and then one corresponding monolingual speech recognition system is selected to recognize the input speech signals, according to the result of the language identification. The other method is that the speech signals are simultaneously input to all of those monolingual speech recognition system units and each of the monolingual speech recognition system units will recognize the input speech signals and give an estimated score. The one having the highest estimated score is taken as the output of the multilingual speech recognition system.

The foregoing conventional manner of recognizing speech has several disadvantages, including the following:

(a) Since each one of the monolingual speech recognition system units by itself should be one complete speech recognition unit, it will take a great deal of manpower and resources to build the multilingual speech recognition system.

(b) It will reduce the performance of speech recognition if the language identification is performed in advance. That is because if the language identification has got an error, then the recognition error occurred after speech recognition. However, if the language identification is not performed in advance, then the computation load of the speech recognition system would be heavy due to various languages being involved.

2. A language independent acoustic model is needed to be built up so as to be suitable for fitting into various languages. The speech recognition system, which is formed according to the acoustic model, needs not many speech recognition apparatuses, and also needs not a great amount of collection of the language related information for each language. The whole speech recognition system only needs a speech recognition apparatus with language independent capability. However, it is very difficult to perform this method since those various languages all have different properties. It is indeed true that an acoustic model that can be simultaneously suitable for many different languages is vary difficult to set up.

3. A speech recognition system is designed to allow the users themselves to build up new vocabularies. When the users use the new vocabularies or the vocabularies for the other languages, the new vocabularies can be added into the vocabulary acoustic model by the users themselves. The newly added vocabularies and the original vocabularies are used together to perform the speech recognition operation, and then it depends on the score determined by the recognition apparatus and accordingly decides to output the speech language output that has the highest score. In this manner, it has the disadvantages that the acoustic model of the newly added vocabularies is speaker dependent. Each one of the users is required to build up or her own acoustic model. As a result, the convenience for the recognition system is decreased.

In the various applications of the multilingual speech recognition system, since the users very frequently use a great amount of vocabulary for the primary language, but the users only use the vocabularies for languages other than the primary language in a rare situation. For example, an automatic phone inquiry system that uses the primary language at the local area, such as Mandarin in Taiwan, uses Mandarin for the name most of time. Occasionally, the phone inquiry system may state the person's name with English or the local dialect. Therefore, with respect to the applications for the separation between the primary language and the language other than the primary language, if one uses any one of the above three designs, and builds up a very complicated speech recognition system for multilingual use, in which the speech recognition system has equal speech recognition capability for any one of the various languages. In this manner, operation of the speech recognition system consumes resources, since the application for those languages other than the primary language has a need in speech recognition capability much less than the need for the primary language.

SUMMARY OF THE INVENTION

It is therefore an objective of the present invention to provide a speech recognition system, which is capable of a high speech recognition rate for multiple languages and for which building up a complete set of speech data bank and acoustic models for each of the languages being used is not necessary. In this manner, the cost for building up the speech recognition system can be greatly reduced.

In accordance with the foregoing and another objective of the present invention, the present invention provides a speech recognition system. The speech recognition system is used to receive a speech signal and output an output language word with respect to the speech signal. The speech recognition system has preset quantities for a first threshold, a second threshold, and a third threshold. The speech recognition system comprises a first speech recognition device that is used to receive the speech signal and generate a first candidate language word and a first confidence measurement of the first candidate language word, according to the speech signal. A second speech recognition device is used to receive the speech signal and generate a second candidate language word and a second confidence measurement of the second candidate language word, according the speech signal. A confidence measurement judging unit is used to output the language word, according to the first confidence measurement and the second confidence measurement, in which when the first confidence measurement is less than the first threshold and the second confidence measurement is less than the second threshold, the first candidate language word is set as the output of language word. In other cases, when the first confidence measurement is greater than the first threshold and the second confidence measurement is less than the third threshold, the first candidate language word is set to be the output language word. When the first confidence measurement is less than the first threshold, and the second confidence measurement is greater than the second threshold, then the second candidate language word is set to be the output language word. When the second confidence measurement is greater than the third threshold, the second candidate language word is set to be the output language word.

In accordance with the foregoing and still another objective of the present invention, the present invention provides another speech recognition system. The speech recognition system is used to receive a speech signal and output an output language word with respect to the speech signal. The speech recognition system has preset quantities for a first threshold, and a second threshold. The speech recognition system further includes a storage device, wherein the storage device is used to receive the speech signal and output the speech signal. The speech recognition system comprises a first speech recognition device that is used to receive the speech signal and generate a first candidate language word and a first confidence measurement of the first candidate language word, according to the speech signal. A confidence measurement judging unit is used to determine the output of the language word. A second speech recognition device, which is controlled by the confidence measurement judging unit, is used to receive the speech signal output from the storage device. Then second speech recognition device then generates a second candidate language word and a second confidence measurement of the second candidate language word, according to the speech signal, in which the confidence measurement judging unit first judges whether or not the first confidence measurement is greater than the first threshold. If it is, then the first candidate language word is taken as the output language word. If it is not, then the confidence measurement judging unit triggers the second speech recognition device to generate a second language word and a second confidence measurement. After that, it is judged whether or not the second confidence measurement is greater than the second threshold. If it is, then the second candidate language word is taken as the output language word. If it is not, then the first candidate language word is taken as the output language word.

According to a further objective of the present invention, the invention provides a speech recognition method. The method includes the following steps: First, a speech signal is fed into a first speech recognition device and a second speech recognition device. Then, the first speech recognition device is triggered to generate a first candidate language word and a first confidence measurement, according to the speech signal. Also, the second speech recognition device is triggered to generate a second candidate language word and a second confidence measurement, according to the speech signal. If the first confidence measurement is less than the first threshold and the second confidence measurement is less than the second threshold, then the first candidate language word is taken as the output language word. If the first confidence measurement is greater than the first threshold and the second confidence measurement is less than a third threshold, then the first candidate language word is taken as the output language word. If the first confidence measurement is less than the first threshold and the second confidence measurement is greater than the second threshold, then the second candidate language word is taken as the output language word. If the second confidence measurement is greater than the third threshold, then the second candidate language word is taken as the output language word.

According to yet another objective of the present invention, the invention provides a speech recognition method. The method includes the following steps: In the step (a), a speech signal is fed into a first speech recognition device. In the step (b), the first speech recognition device is triggered to generate a first candidate language word and a first confidence measurement, according to the speech signal. In the step (c), it is judged whether or not the first confidence measurement is greater than the first threshold. If it is, then the first candidate language word is taken as the output language word, and then the process of the method goes to the end. In the step (d), the speech signal is fed into a second speech recognition device and the second speech recognition device is triggered to generate a second candidate language word and a second confidence measurement, according to the input speech signal. In the step (e), it is judged whether or not the second confidence measurement is greater than the second threshold. If it is, then the second candidate language word is taken as the output language word, and then the process goes to the end. If it is not, then the first candidate language word is taken as the output language word.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

First Embodiment

Figure 1:
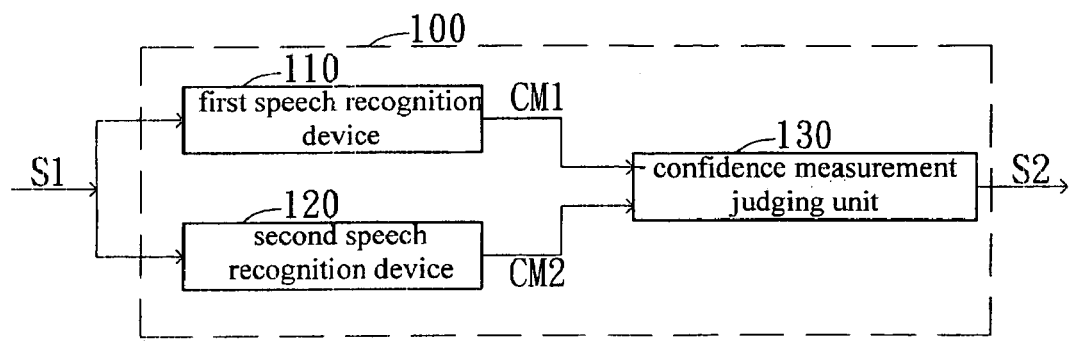
FIG. 1 is a block diagram, schematically illustrating the speech recognition system, according to the first preferred embodiment of the present invention.

FIG. 1 is a block diagram, schematically illustrating the speech recognition system, according to the first preferred embodiment of the present invention. Referring to FIG. 1, the speech recognition system 100 includes a first speech recognition device 110, a second speech recognition device 120, and a confidence measurement judging unit 130. The speech recognition system 100 is used to receive a speech signal S1 and perform a comparison on the speech signal S1, so as to perform speech recognition and output an output language word S2 with respect to the speech signal S1. The first speech recognition device 110 can be a continuous speech recognition device. When the first speech recognition device is operated, the continuous speech recognition device can be used in a lot of different applications for speech recognition. In the different technique fields, it only is necessary to change the lexicon; to again build the whole new model is not necessary. The second speech recognition device 120 can be an isolated word speech recognition device. However, the process to build up the system for the isolated word speech recognition device and the process to recognize the speech are much easier than such processes for the continuous speech recognition device. In order to build up the system for the isolated word speech recognition device, it is required only to collect a small amount of speech data for each of single words, and it is also possible to collect the single words for each different language. Then, all the speech data for the same single word are integrated to build up an acoustic model. When one speech signal is fed into the isolated word speech recognition device, the isolated word speech recognition device compares the speech signal with each single word of the isolated word speech acoustic model. In the comparison, the one with higher score of the comparison result would be the most probable candidate for this speech signal.

As shown in FIG. 1, a speech signal S1 is fed into the first speech recognition device 110 and the second speech recognition device 120 of the speech recognition system 100. The first speech recognition device 110 and the second speech recognition device 120 will take the recognition action with respect to the speech signal S1. As a result, a first candidate language word is outputted from the first speech recognition device 110. Also, a second candidate language word is outputted from the second speech recognition device 120. Taking the first speech recognition device 10 as an example, after the first speech recognition device 110 takes the recognition action on the speech signal S1, several possible candidate language words are generated. These candidate language words are transmitted to an utterance verification module (not shown) of the first speech recognition device 110. The utterance verification module (not shown) can compute a confidence measurement (CM) for each possible candidate language word. The candidate language word with the highest confidence measurement is set to be the first candidate language word of the first speech recognition device 110. The confidence measurement of the first candidate language word is set to be the first confidence measurement CM1. Likewise, after the second speech recognition device 120 then recognizes the speech signal S1, it can generate the second candidate language word. The confidence measurement of the second candidate language word is the second confidence measurement CM2.

A confidence measurement judging unit 130 of the speech recognition system 100 will receive the first candidate language word and the first confidence measurement CM1 of the first speech recognition device 110, and also the second candidate language word and the second confidence measurement CM2 of the second speech recognition device 120. The confidence measurement judging unit 130 judges which one of the first candidate language word and the second candidate language word is to be selected as the output of the output language word S2 from the confidence measurement judging unit 130, according to the values of the first confidence measurement CM1 and the second confidence measurement CM2. The confidence measurement judging unit 130 has a preset threshold, such as a first threshold TH1, a second threshold TH2, and a third threshold TH3, in which TH2 is less than TH3. All the thresholds and the confidence measurements are known in the prior art skill for testing the words. It is therefore not further described here. The confidence measurement judging unit 130 has the following judging rule, where the order of the testing rules can be adjusted according to the actual design in performance:

1. When the first confidence measurement CM1 is less than the first threshold TH1, and the second confidence measurement CM2 is less than the second threshold TH2, then the first candidate language word is selected as the output language word S2.

2. When the first confidence measurement CM1 is greater than the first threshold TH1, and the second confidence measurement CM2 is less than the third threshold TH3, then the first candidate language word is selected as the output language word S2.

3. When the first confidence measurement CM1 is less than the first threshold TH1, and the second confidence measurement CM2 is greater than the second threshold TH2, then the second candidate language word is selected as the output language word S2.

4. When the second confidence measurement CM2 is greater than the third threshold TH3, then the second candidate language word is selected as the output language word S2.

Figure 2:
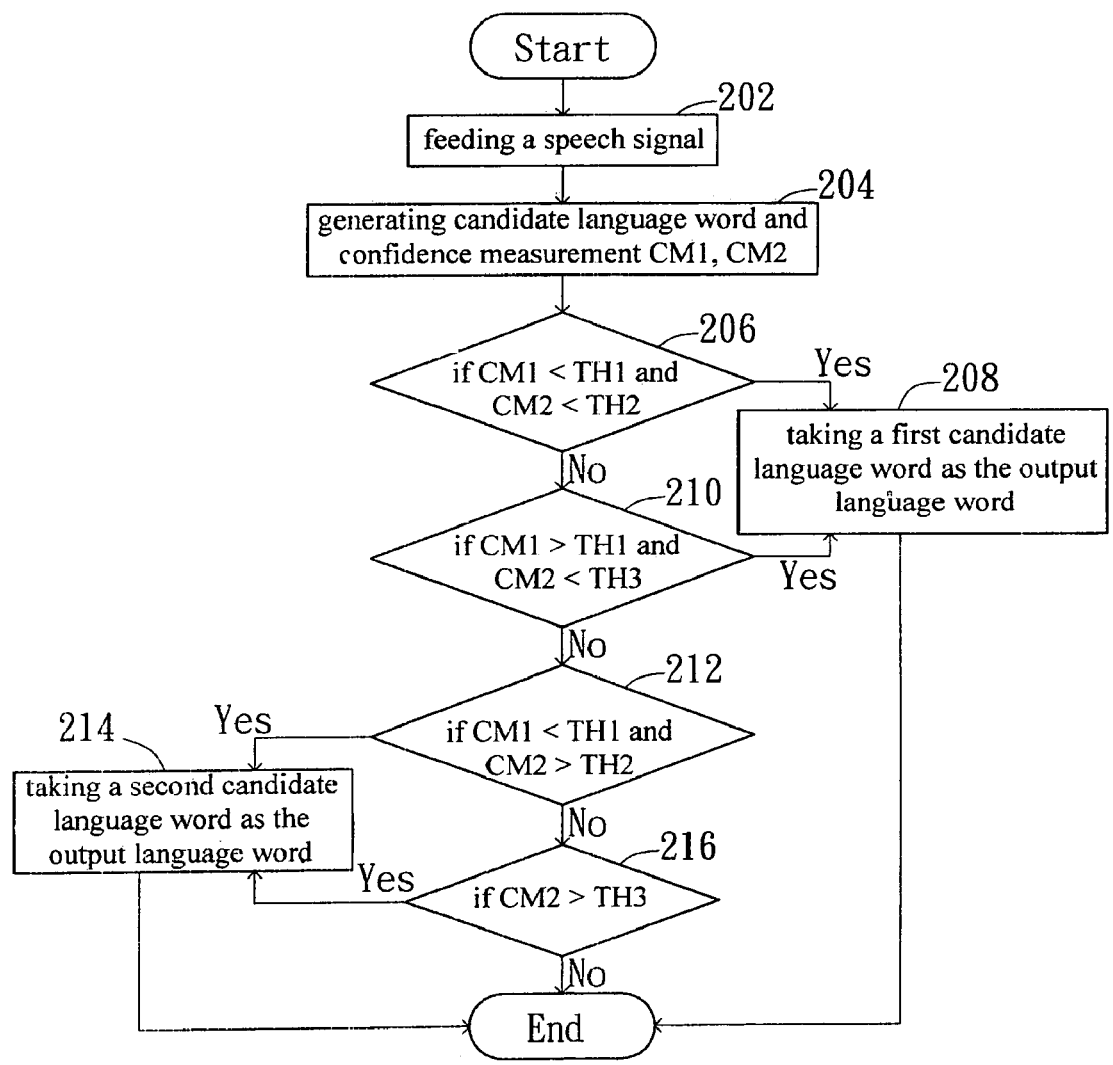
FIG. 2 is process flow diagram, schematically illustrating the speech recognition method, according to the embodiment of the present invention.

FIG. 2 is process flow diagram, schematically illustrating the speech recognition method, according to the embodiment of the present invention. As shown in FIG. 2, in the step 202, the speech signal S1 is fed into the speech recognition device 110 and the speech recognition device 120. In the step 204, the first speech recognition device 110 generates a first candidate language word and a first confidence measurement CM1, according to the speech signal S1. The second speech recognition device 120 also generates a second candidate language word and a second confidence measurement CM2, according to the speech signal S1. After that, the procedure enter the step 206, which judges whether or not the first confidence measurement CM1 is less than the first threshold and the second confidence measurement CM2 is less than the second threshold (CM1<TH1 and CM2<TH2). If it is, then the process goes to the step 208. If it is not, the process goes to the step 210. In the step 208, the first candidate language word is selected as the output language word S2. In the step 210, it is judged whether or not the first confidence measurement CM1 is greater than the first threshold and the second confidence measurement CM1 is less than the third threshold (CM1>TH1 and CM2<TH3). If it is, the process goes to the step 208. If it is not, the process goes to the step 212. In the step 212, it is judged whether the first confidence measurement CM1 is less than the first threshold and the second confidence measurement CM2 is greater than the second threshold (CM1<TH1 and CM2>TH2). If it is, then the process goes to the step 214. If it is not, the process goes to the step 216. In the step 214, the second candidate language word is set as the output language word S2. In the step 216, it judges whether or not the second confidence measurement is greater than the third threshold (CM2>TH3). If it is, then the process goes to the step 214. For the steps 206, 210, 212, and 216, their order of the steps can be changed, according to actual operation.

Embodiment 2

Figures 3, 4:
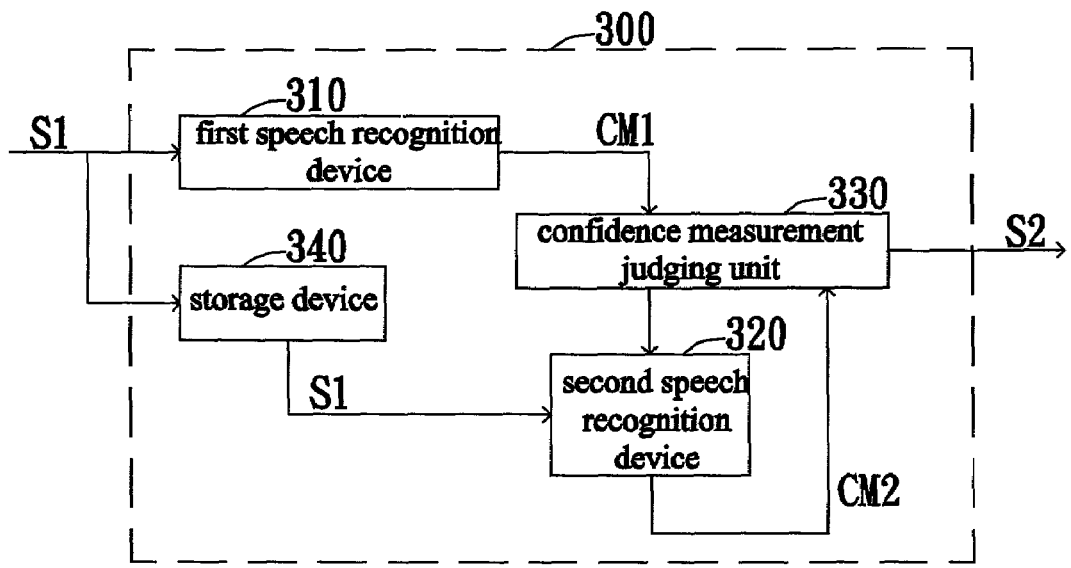
FIG. 3 is a block diagram, schematically illustrating the speech recognition system, according to the second preferred embodiment of the present invention.
FIG. 4 is a drawing, schematically illustrating test results by querying an auto-attendant system.

FIG. 3 is a block diagram, schematically illustrating the speech recognition system, according to the second preferred embodiment of the present invention. As shown in FIG. 3, the speech recognition system 300 includes a first speech recognition device 310, a second speech recognition device 320, a confidence measurement judging unit 330, and a storage device 340. The speech recognition system 300 is used to receive a speech signal S1 and performs the recognition action on the speech signal S1. As a result, an output language word S2 with respect to the speech signal S1 is outputted. The first speech recognition device 310 in FIG. 3 and the first speech recognition device 110 in FIG. 1 are similar and all are a continuous speech recognition device. Also, the second speech recognition device 320 in FIG. 3 and the second speech recognition device 120 in FIG. 1 are similar, and all are an isolated word speech recognition device.

As shown in FIG. 3, the speech signal S1 is fed into the first speech recognition device 310 and the storage device 340. And then, the first speech recognition device 310 will generate, according to the speech signal S1, a first candidate language word and a first confidence measurement CM1. Also, the first candidate language word and the first confidence measurement CM1 are fed into the confidence measurement judging unit 330. Also, a threshold, such as a first threshold TH1 and a second threshold TH2, is preset in the confidence measurement judging unit 330. The confidence measurement judging unit 330 judges whether or not the first confidence measurement CM1 is greater than the first threshold TH1. If it is, the confidence measurement judging unit 330 would select the first candidate language word to be an output therefrom as the output language word S2. If it is not, the confidence measurement judging unit 330 would cause the second speech recognition device 320 to read the speech signal S1 stored in the storage device 340. The second speech recognition device 320 can generate, according to the speech signal S1, a second candidate language word and a second confidence measurement CM2. Then, the second speech recognition device 320 feeds the second candidate language word and the second confidence measurement CM2 into confidence measurement judging unit 330. Then, the confidence measurement judging unit 330 judges whether or not the second confidence measurement CM2 is greater than the second threshold TH2. If it is, the confidence measurement judging unit 330 would take the second candidate language word to be the output language word S2. If it is not, the speech signal S1 is taken as the output language word S2.

The process flow for the speech recognition system as described in FIG. 3 is as follows: First, the speech signal S1 is fed into the first speech recognition device 310, and then the speech recognition device 310 generates a first candidate language word and a first confidence measurement CM1, according to the speech signal S1. And then, the confidence measurement judging unit 330 judges whether or not the first confidence measurement CM1 is greater than the first threshold TH1 (CM1>TH1). If it is, then the confidence measurement judging unit 330 would take the first candidate language word to be an output as the output language word S2, and then the process would go to an end. If it is not, then the confidence measurement judging unit 330 would cause the second speech recognition device 320 to receive the speech signal S1 outputted from the storage device 340. Then, the second speech recognition device 320 would generate a second candidate language word and a second confidence measurement CM2, according to the received speech signal S1. Also, the confidence measurement judging unit 330 would judge whether or not the second confidence measurement CM2 is greater than the second threshold TH2 (CM2>TH2). If it is, then the confidence measurement judging unit 330 takes the second candidate language word to be an output as the output language word S2. The process then goes to an end. If it is not, the confidence measurement judging unit 330 would take the first candidate language word to be an output as the output language word S2.

The following is the results by taking an auto-attendant system for making experiments in accordance with the foregoing first embodiment and second embodiment. The auto-attendant system used for the experiment is of a type able to recognize a person's names for Mandarin, English, and Taiwanese. Also and, after the inquired person name has be found, the system also automatically inquires the phone number of the inquired person for the user. The auto-attendant system is first implemented with a Mandarin speech recognition device as the first speech recognition device. The second speech recognition device is a non-Mandarin speech recognition device with ability to recognize multilingual words but other than Mandarin. The Mandarin speech recognition device has an ability to recognize the keyword for a large number of Mandarin names, such as 6000 Mandarin person's names. The recognition action for the keyword is done by fetching a part of the speech signal to serve as the keyword and giving no consideration to the recognition result for the other part not including any keyword. For example, when the user says: "I am looking for AAA person", the words of "I am looking for" are the non-keywords. However, the word of "AAA" is the keyword. For the Mandarin speech recognition device, a sub-syllable hidden Markov model is taken as the acoustic model, in which it includes about 100 for right context dependent initial model, 38 for final model, and one silence model. The initial model has three states, the final model has five states, and the silence model has one state, in which each of the states includes two-state transition probability, that is about staying at the current state or transferring out, and a Gaussian mixture probability distribution. The maximum number for mixture is 10. It also uses the database of mandarin speech across Taiwan with a type of MAT2000.

The non-Mandarin speech recognition device used in the auto-attendant system is a non specific language isolated word speech recognition device that is able to recognize a person's name in English and Taiwanese. In order to build up and train the acoustic model for the non-Mandarin speech recognition device, it needs to collect the speech data of the person's name for English and Taiwanese (non-Mandarin), such as 40 English person's names and 10 Taiwanese person's name. Each of the non-Mandarin person's name is respectively recorded three times by 10 men and 10 women, so as to collect the 60 speech files for building up and training the acoustic model. The above Mandarin speech recognition device is a speech recognition device for the primary language, and the non-Mandarin speech recognition device is a speech recognition device for the non primary language.

The auto-attendant system is tested by taking 1530 Mandarin sentences for the speech testing data and 1044 non-Mandarin sentences for the speech testing data, in which the speech testing data of those 1530 Mandarin sentences are collected from the online sources of the auto-attendant system. And the speech testing data of those 1044 non-Mandarin sentences are obtained by 5 men and 2 women by respectively recording three times with respect to the non-Mandarin person's names. Referring to FIG. 4, FIG. 4 is a drawing, schematically illustrating the tested results by inquiring from an auto-attendant system. As shown in FIG. 4, the Mandarin speech recognition rate, according to the first embodiment, is about 91.70%, and the speech recognition rate for the non-Mandarin is about 92.23%. According to the second embodiment, the Mandarin speech recognition rate is about 91.93% and the speech recognition rate for the non-Mandarin is about 85.54%. According to the above testing results, it can be seen that the accuracy rate for the Mandarin events and the non-Mandarin events in accordance with the first embodiment is more similar, but the accuracy rate for the Mandarin events and the non-Mandarin events in accordance with the second embodiment has a larger difference. But, if most of the users use the Mandarin inquiring with a rather higher rate, then since the second preferred embodiment has less computation load for the Mandarin speech than the computation load for the Mandarin speech in accordance with the first preferred embodiment, the second preferred embodiment has higher recognition speed than that of the first preferred embodiment.

The foregoing speech recognition system disclosed in the foregoing descriptions for the embodiment, has the following characteristics:

1. The invention has high speech recognition rate for multiple various languages.

2. The invention is not necessary to respectively build up the whole complete set of speech data bank and the acoustic model for all the languages in use. Therefore, it can save the equipment cost for setting up the speech recognition system.

3. The speech recognition system of the invention is suitable for use for non specific languages, whereby users who speak different languages can use the system without building up the acoustic model again.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A speech recognition system, used for receiving a speech signal and output an output language word with respect to the speech signal, wherein the speech recognition system has a first threshold, a second threshold, and a third threshold, the speech recognition system comprising:
   a first speech recognition device, used to receive the speech signal and generate a first candidate language word and a first confidence measurement of the first candidate language word, according to the speech signal;
   a second speech recognition device, used to receive the speech signal and generate a second candidate language word and a second confidence measurement of the second candidate language word, according to the speech signal; and
   a confidence measurement judging unit, used to judge and output the output language word, according to the first confidence measurement and the second confidence measurement;
   wherein when the first confidence measurement is less than the first threshold and the second confidence measurement is less than the second threshold, the first candidate language word is taken as the output language word, when the first confidence measurement is greater than the first threshold and the second confidence measurement is less than the third threshold, the first candidate language word is set to be the output language word, when the first confidence measurement is less than the first threshold and the second confidence measurement is greater than the second threshold, then the second candidate language word is set to be the output language word, and when the second confidence measurement is greater than the third threshold, the second candidate language word is set to be the output language word.

2. The speech recognition system according to claim 1, wherein the first speech recognition device is a continuous speech recognition device.

3. The speech recognition system according to claims 1 or 2, wherein the second speech recognition device is an isolated word speech recognition device.

4. The speech recognition system according to claim 3, wherein the second speech recognition device can recognize at least one language.

5. A speech recognition system, used to receive a speech signal and output an output language word with respect to the speech signal, wherein the speech recognition system has preset quantities for a first threshold and a second threshold, the speech recognition system further includes a storage device, wherein the storage device is used to receive the speech signal and output the speech signal, the speech recognition system comprising:
   a first speech recognition device, which is used to receive the speech signal and generate a first candidate language word and a first confidence measurement of the first candidate language word, according to the speech signal;
   a confidence measurement judging unit, which is used to determine the output language word; and
   a second speech recognition device, which is controlled by the confidence measurement judging unit and is used to receive an output of the speech signal output from the storage device and generate a second candidate language word and a second confidence measurement of the second candidate language word, according to the speech signal,
   wherein the confidence measurement judging unit judges whether or not the first confidence measurement is greater than the first threshold, if it being yes, then the first candidate language word is taken as the output language word, if it being no, then the confidence measurement judging unit causes the second speech recognition device to generate a second language word and a second confidence measurement, and then judges whether or not the second confidence measurement is greater than the second threshold, if it being yes, then the second candidate language word is taken as the output language word, if it being no, then the first candidate language word is taken as the output language word.

6. The speech recognition system according to claim 5, wherein the first speech recognition device is a continuous speech recognition device.

7. The speech recognition system according to claims 5 or 6, wherein the second speech recognition device is an isolated word speech recognition device.

8. The speech recognition system according to claim 7, wherein the second speech recognition device can recognize at least one language.

9. A speech recognition method, the method comprising the following steps:
   feeding a speech signal into a first speech recognition device and a second speech recognition device;
   the first speech recognition device generating a first candidate language word and a first confidence measurement, according to the speech signal, and the second speech recognition device generating a second candidate language word and a second confidence measurement, according to the speech signal; and
   if the first confidence measurement being less than the first threshold and the second confidence measurement being less than the second threshold, then the first candidate language word being taken as the output language word, if the first confidence measurement being greater than the first threshold and the second confidence measurement being less than a third threshold, then the first candidate language word being taken as the output language word, if the first confidence measurement being less than the first threshold and the second confidence measurement being greater than the second threshold, then the second candidate language word being taken as the output language word, and if the second confidence measurement being greater than the third threshold, then the second candidate language word being taken as the output language word.

10. The speech recognition method according to claim 9, wherein first speech recognition device is a continuous speech recognition device.

11. The speech recognition method according to claim 9 or 10, wherein the second speech recognition device is an isolated word speech recognition device.

12. The speech recognition method according to claim 11, wherein the second speech recognition device can recognize at least one language.

13. A speech recognition method, the method comprising the following steps:
   (a) feeding a speech signal into a first speech recognition device;
   (b) the first speech recognition device generating a first candidate language word and a first confidence measurement, according to the speech signal;
   (c) judging whether or not the first confidence measurement is greater than the first threshold, if it being yes, then the first candidate language word being taken as the output language word and then the method goes to an end;
   (d) feeding the speech signal into a second speech recognition device and the second speech recognition device generating a second candidate language word and a second confidence measurement, according to the input speech signal; and
   (e) judging whether or not the second confidence measurement is greater than the second threshold, if it being yes, then the second candidate language word being taken as the output language word, if it being no, then the first candidate language word being taken as the output language word.

14. The speech recognition method according to claim 13, wherein first speech recognition device is a continuous speech recognition device.

15. The speech recognition method according to claims 13 or 14, wherein the second speech recognition device is an isolated word speech recognition device.

16. The speech recognition method according to claim 15, wherein the second speech recognition device can recognize at least one language.

* * * * *